United States Patent [19]

Robertson

[11] 4,061,076
[45] Dec. 6, 1977

[54] MILLING CUTTER

[75] Inventor: Donald A. Robertson, Union Lake, Mich.

[73] Assignee: Indexomatic, Inc., Farmington, Mich.

[21] Appl. No.: 707,884

[22] Filed: July 22, 1976

[51] Int. Cl.² ............................................. B23C 5/26
[52] U.S. Cl. .................................. 90/11 A; 279/1 A; 407/49
[58] Field of Search ........ 90/11 A; 29/105 R, 105 A; 279/1 A, 1 J, 1 ME

[56] References Cited

U.S. PATENT DOCUMENTS

| 3,041,898 | 7/1962 | Better | 90/11 A |
|---|---|---|---|
| 3,091,138 | 5/1963 | Berry | 29/105 A |
| 3,119,625 | 1/1964 | Marr | 90/11 A |
| 3,703,113 | 11/1972 | Feisel | 90/11 A |

Primary Examiner—Leonidas Vlachos
Attorney, Agent, or Firm—Fisher, Gerhardt & Groh

[57] ABSTRACT

A milling tool having multiple parts to facilitate tool change in which detachable metal cutting edges are mounted on an annular ring supported from an adapter mounted on the milling machine. The adapter includes a support plate for supporting the cutting ring and a pilot member which is biased against the cutting ring to insure that it is centered relative to the axis of rotation.

10 Claims, 3 Drawing Figures

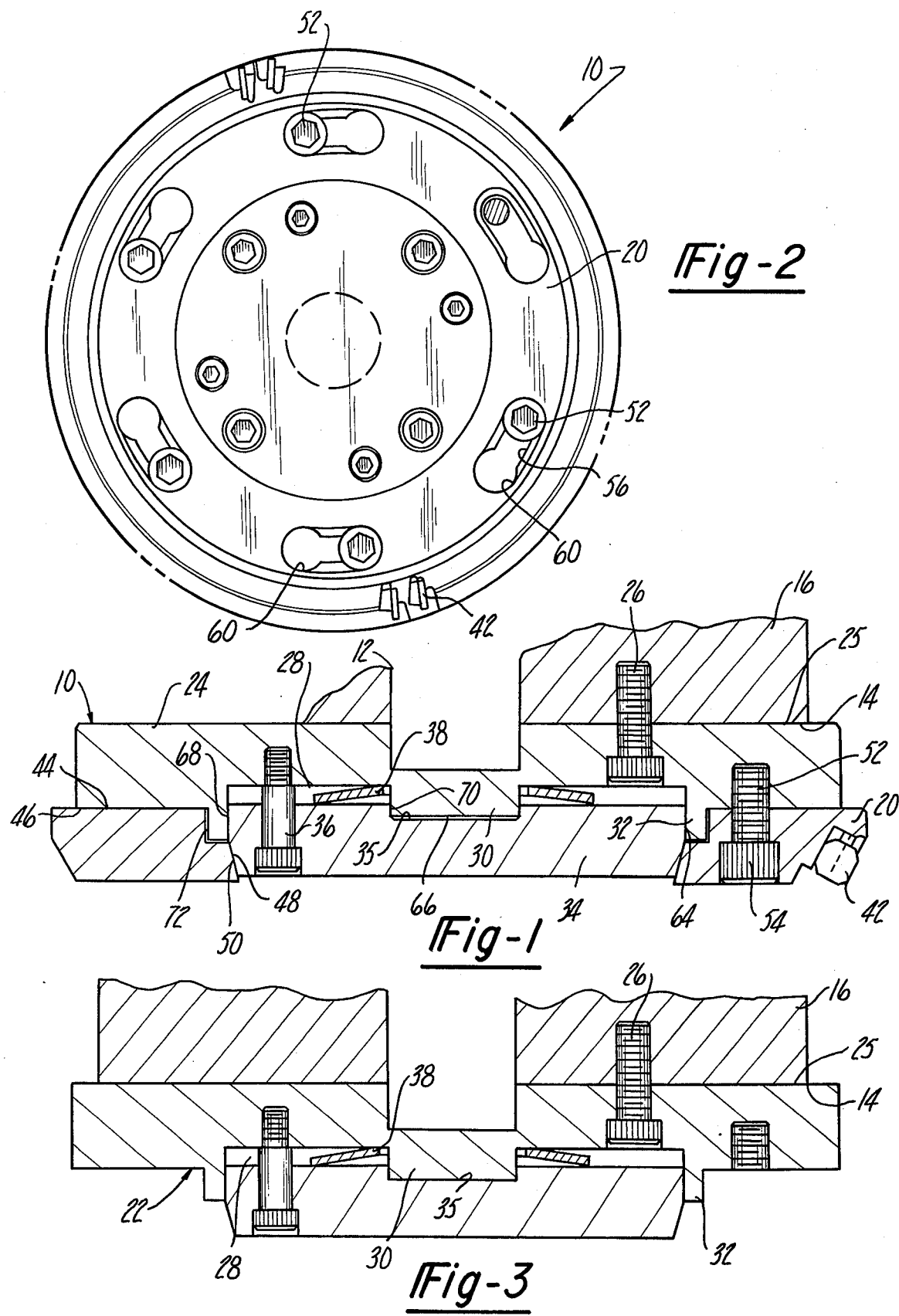

MILLING CUTTER

The present invention relates to metal working tools and more particularly to milling tools or cutters.

Milling tools or cutters used in metal working, particularly when the cutters are of very large size, are made in several parts to avoid the excessive weight of single piece milling tools. Large, single piece milling tools become excessively heavy and create handling problems when it becomes necessary to sharpen or replace the cutting portions of the tools. To avoid this problem milling tools have been made in multiple parts in which an adapter is fastened to the rotary spindle of a milling machine and an annular cutting ring which supports the cutting edges is mounted relative to the adapted. The ring can be relatively light and when it becomes necessary to change cutting inserts or to sharpen them, only the cutting ring is removed and the adapted is left in place on the spindle of the milling machine.

Multiple part milling tools present two principal problems which have been difficult of solution. The annular cutting ring must be supported to absorb axial loads, particularly at points radially spaced from the axis of rotation and immediately above the cutting tool inserts. Also, it is necessary that the annular ring be very accurately centered relative to the axis of rotation to insure accurate cutting and long tool life.

In the prior art, manufacturers of multiple part milling tools have found it necessary to provide excessive radial clearance between the annular tool and the adapter on which the cutting ring is mounted in order to accomodate the large temperature differentials that are encountered when tool changes are made. A milling tool becomes relatively hot during the cutting operation on metal and when the cutting edges become dull and must be replaced the cutting ring must be removed and the new cutting ring will be relatively cool. The substantial difference in temperature between the adapter and the cutting ring makes it necessary to afford ample radial clearances to accommodate the differences in temperatures and the corresponding dimensional changes in the mating parts that are encountered between the time the tool change is made and the time that the assembly reaches a more uniform temperature during its use. In prior art milling cutting tools, the provision of the required large radial clearance to accommodate dimensional changes has made it extremely difficult to accurately center the cutting ring or tool relative to the axis of rotation and such accurate centering is imperative for proper milling operations and tool life.

It is an object of the invention to provide a multiple part milling tool having an annular cutting tool which may be easily and rapidly detached from the milling machine and at the same time accurately attached in alignment with the axis of rotation of the milling machine.

Another object of the invention is to provide a multiple part milling tool in which the milling tool not only is accurately centered but also is properly supported to absorb axial loads.

It is another object of the invention to provide a milling tool having a detachable metal cutting portion which is centered relative to the axis of rotation during the time that the cutting portion is being connected to the cutting tool adapted so that special measurements need not be taken and special procedures need not be followed.

The milling tool of the present invention incorporates an adapter which acts to support a cutting ring on which the cutting edges of a milling tool are mounted. The adapter includes a pilot portion which is moved axially relative to the remainder of the adapter and is provided with guide surfaces which act with complementary guide surfaces on the cutter ring during attachment of the latter to the adapter. The complementary guide surfaces maintain the tool accurately centered relative to the axis of rotation despite the wide radial spacing between the adapter and the cutting ring when the two parts are relatively cool.

FIG. 1 is a cross-sectional view of a milling tool embodying the invention and shown attached to the end of a milling machine spindle;

FIG. 2 is a bottom end view of the milling tool in FIG. 1; and

FIG. 3 is a view similar to FIG. 1 showing a portion of the milling tool after the cutting portion has been removed.

Referring to the drawings a milling tool embodying the present invention is designated generally at 10. The milling tool is of the type used for face milling in which the tool is rotated about the axis of a generally vertical shaft indicated at 12 and the material being worked on or cut is moved horizontally relative to the milling tool.

The milling or cutting tool 10 is adapted to be mounted and positioned against the lower end 14 of a milling machine spindle 16. The milling tool 10 includes an annular cutting ring 20 and an adapter assembly 22 which are fastened together and to the end 14 of the spindle 16 for rotation as a unit therewith.

The adapter assembly includes an adapter plate 24 which is mounted with its upper surface 25 adjacent the end 14 of the spindle 16 by means of several spindle mounting screws 26. The underside of the adapter plate 24 is provided with an annular cavity 28 the center of which is defined by a hub 30 and the outer periphery of which is defined by an annular flange 32. The cavity 28 receives an adapter pilot 34 which is generally disc shaped. The upper surface of the adapter pilot is formed with a recess 35 which receives the hub 30 on the adapter plate 24. The adapter pilot 34 is held in position relative to the adapter plate 24 by means of shoulder screws 36. Disposed in the annular cavity 28 is a spring washer 38 which reacts between the adapter plate 24 and the adapter pilot 34 to urge the latter downwardly toward the heads of the shoulder screws 36.

The adapter assembly 22 is used to detachably support an annular cutting ring 20 which has a plurality of cutting edges or cutting inserts 42 disposed at the outer periphery of the cutting ring. The upper side of the cutter ring has an annular support face 44 which is adapted to abut with a mating support face 46 formed adjacent to and radially outward from the annular flange 32 of the adapter plate 24. The cutter ring 20 has a beveled surface 48 forming its inner periphery which in the assembled condition of the milling cutter 10 mates with a complementary frusto-conical or beveled surface 50 formed at the periphery of the adapter pilot 34.

The cutter ring 20 is held in position with its support face 44 in engagement with the support face 46 of the adapter rings by means of a plurality of socket head cap screws 52 which are threadably engaged with the adapter plate 24. The socket head screws 52 are provided with heads 54 which engage the marginal edges of locking slots 56 formed at uniformly spaced intervals in the cutter ring 20.

Starting with the assembled milling tool 10 as seen in FIG. 1, the cutter ring 20 may be removed and replaced relative to the adapter assembly 22 by loosening the screws 52. Initial loosening of the screws permits the spring washer 38 to force the adapter pilot 34 downwardly and at the same time to move the cutter ring 20. After the screws 52 have been loosened a predetermined amount the adapter pilot 34 will come to rest against the heads of the shoulder screws 26. Thereafter, additional loosening of the screws 52 will permit rotational movement of the cutter ring 20 relative to the adapted assembly 22. The cutter ring is rotated so that the screws 52 slide in the locking slots 56. When the heads 54 of the screws 52 come into alignment with the enlarged portion 60 of the locking slots 56 the cutting ring may be lowered vertically relative to the adapter assembly and the adapter 22 appears as it is seen in FIG. 3, in condition to receive a new cutter ring 20.

To attach a cutter ring 20 to the adapter assembly 22, seen in FIG. 3, the enlarged portions 60 of all of the locking slots 56 are placed in alignment with all of the heads 54 of the sockets screws 52 after which the cutter ring is moved upwardly to bring the beveled edges 48 into contact with the beveled edges of the adapter pilot 34. Thereafter, the cutter ring is rotated in a clockwise direction as viewed in FIG. 2 to bring the heads of the cap screws 52 into the narrower portion of the locking slots 56. In this position the heads 54 of the screws 52 are effective to hold the cutting ring 20 vertically relative to the adapter 22. With the cutter ring 20 held in vertical position, the cap screws 52 are tightened to first bring the beveled surfaces 48 into engagement with the beveled surface 50. This serves to center the ring 20 relative to the axis of rotation 12. Subsequent tightening of screws 52 is against the biasing action of the spring 38 until the cutter ring is brought into engagement with the support face 46 of the adapter ring 24. During such movement the beveled faces 48 and 50 of the cutter ring and adapter pilot respectively remain in contact with each other to insure that the cutter ring remains centered relative to the axis 12. Only the complementary beveled surfaces 48 and 50 and the complementary support faces 44 and 46 engage each other.

The complementary beveled edges 48 and 50 are maintained in contact with each other by means of the beveled washer like spring 38 which exerts a substantial force on the adapter pilot 34 tending to hold the beveled surfaces 48 and 50 of the cutter ring and adapter pilot engaged with each other. With a milling cutter tool having a 15 inch diameter, a spring 38 exerting a force of more than 2,500 pounds would be used.

The complementary support faces 44 and 46 are held in engagement with each other against the action of the annular spring 38 by means of the cap screws 52 in the locking slots 56. The remaining axially facing surfaces of the cutter ring 20, the adapter plate 24 and the adapter pilot 34 are deliberately spaced from each other to insure that upon tightening of the screws 52 the complementary surfaces 44 and 46 will come into engagement with each other without interference. Such clearance gaps are afforded by the cavity 28 and the spaces indicated at 64 and at 66 adjacent the end of the hub 30.

Since the adapter plate 24 and the adapter pilot 34 remain in their assembled condition during both tool use and tool changes, temperature affects these parts similarly so that radial clearance need not be provided between the radially meeting locations indicated at 68 and 70. As a consequence, the dimensions of the plate 24 and adapter 34 may be very closely maintained so that these parts are accurately aligned relative to each other and to the axis of rotation of the milling tool. Because the cutter ring 20 often will have a substantially different temperature and dimensional orientation, a radial clearance may be provided by the spacing indicated at 72. This radial spacing 72, however, is accomodated by the complementary beveled surfaces 48 and 50. The complementary beveled surfaces 48 and 50 insure centering of the cutter ring and the engaged complementary surfaces 44 and 46 insure that the cutter inserts 42 are supported relative to the milling spindle.

A cutting tool assembly and more specifically a milling tool cutter assembly has been provided in which the various cutting inserts are arranged on a ring which is detachably mounted on an adapter assembly. The adapter assembly is so arranged that it exerts an axial force on an adapter pilot which engages the annular cutting ring to insure that it is centered relative to the axis of rotation. The milling tool cutting assembly is so arranged that as the cutter ring changes temperature the adapter pilot continues to exert force which maintains the cutter ring centered even though dimensional changes occur in the cutter ring at a different rate than in the adapter assembly. The present invention makes it possible to rapidly change from one cutter ring to another cutter ring and at the same time insures that the cutter ring remains very accurately centered relative to the axis of rotation of the milling spindle.

The embodiments of the invention in which an exclusive property or privilege is claimed are defined as follows:

1. A milling tool comprising; an annular cutting tool, a support for said cutting tool including first and second members rotatable as a unit about a common axis, biasing means continuously urging said first and second members axially apart, said annular cutting tool being attachable to one of said members, means for attaching said cutting tool to said one of said members, the other of said members and said cutting tool including complementary annular guide surfaces engageable with each other to maintain said cutting tool concentric to said axis upon movement of said annular cutting tool relative to said one of said members.

2. The combination of claim 1 in which said guide surfaces include a frusto-conical surface on one of said members and a tapered complementary surface on the inner periphery of said annular tool.

3. The combination of claim 1 and further including stop means limiting the amount of movement of said first and second members relative to each other in one direction under the biasing action of said biasing means, and said attaching means including means for moving said cutting tool in the opposite direction against said biasing means during engagement of said guide surfaces with each other.

4. The combination of claim 3 in which said stop means are a plurality of uniformly disposed bolts adjusted to permit limited movement of said first and second members axially relative to each other.

5. The combination of claim 1 in which said first member is adapted to be mounted on the rotatable driving member of a milling machine and in which said second member is guided relative to said first member for axially aligned movement.

6. The combination of claim 1 in which said first and second members form a cavity and in which said biasing means is disposed in said cavity.

7. The combination of claim 6 in which said biasing means is a washer spring disposed in said cavity concetrically with said axis.

8. The combination of claim 1 in which said first member has an annular support surface adjacent the outer periphery thereof and in which said tool has an annular surface complementary to said annular support surface when said cutting tool is mounted to said support.

9. The combination of claim 3 in which said attaching means permits movement of said cutting tool and said second member as a unit a predetermined distance and in which said attaching means may be moved an additional distance to permit independent movement of said cutting tool relative to said support.

10. A milling tool comprising; a tool support including a first member adapted for connection to a rotatable drive member, a second member member connected to said first member for rotation therewith and axial movement relative thereto, a cutting tool attachable to said first member, said cutting tool and said second member including complementary guide surfaces in engagement with each other, biasing means urging said first and second members apart to maintain said guide surfaces continuously in engagement with each other to maintain said cutting tool concentric to said axis, and means connecting said tool to said first member against the action of said biasing means.

* * * * *

UNITED STATES PATENT OFFICE
CERTIFICATE OF CORRECTION

Patent No. 4,061,076  Dated December 6, 1977

Inventor(s) Donald A. Robertson

It is certified that error appears in the above-identified patent and that said Letters Patent are hereby corrected as shown below:

Column 1, line 16 "adapted" should read --adapter--

Column 1, line 19 "adapted" should read --adapter--

Column 1, line 33 "accomodate" should read --accommodate--

Column 1, line 66 "adapted" should read --adapter--

Column 4, line 7 "accomodated" should read -- accommodated --.

Signed and Sealed this

Sixteenth Day of May 1978

[SEAL]

Attest:

RUTH C. MASON  
Attesting Officer

LUTRELLE F. PARKER  
Acting Commissioner of Patents and Trademarks